United States Patent
Pine

(10) Patent No.: US 6,202,165 B1
(45) Date of Patent: Mar. 13, 2001

(54) PHOTONIC CLOCK DISTRIBUTION METHOD AND APPARATUS FOR ELECTRONIC SYSTEMS

(75) Inventor: Joshua I. Pine, Seal Beach, CA (US)

(73) Assignee: Conexant Systems, Inc., Newport Beach, CA (US)

( * ) Notice: Subject to any disclaimer, the term of this patent is extended or adjusted under 35 U.S.C. 154(b) by 0 days.

(21) Appl. No.: 09/121,475

(22) Filed: Jul. 23, 1998

(51) Int. Cl.[7] .................................................. G06F 1/04
(52) U.S. Cl. ............................................................ 713/500
(58) Field of Search ................................. 713/400, 500, 713/503, 600

(56) References Cited

U.S. PATENT DOCUMENTS

| | | | |
|---|---|---|---|
| 4,667,212 | 5/1987 | Nakamura ............................. 257/85 |
| 4,884,243 | * 11/1989 | Johnston et al. ...................... 365/234 |
| 4,959,540 | * 9/1990 | Fan et al. ........................... 250/227.12 |
| 5,045,680 | * 9/1991 | Fan et al. ........................... 250/214 LS |
| 5,095,262 | * 3/1992 | Henley et al. ........................ 324/73.1 |
| 5,394,490 | * 2/1995 | Kato et al. ............................. 385/14 |
| 5,416,861 | * 5/1995 | Koh et al. ............................... 385/14 |
| 5,434,524 | * 7/1995 | Shaw et al. ............................ 327/187 |
| 5,442,475 | * 8/1995 | Bausman et al. ....................... 359/140 |
| 5,812,708 | * 9/1998 | Rao ......................................... 385/14 |
| 6,125,217 | * 9/2000 | Paniccia et al. ......................... 385/14 |

FOREIGN PATENT DOCUMENTS

| | | |
|---|---|---|
| 61230365 | 10/1986 | (JP) . |
| 04241610 | 8/1992 | (JP) . |
| 06332565 | 12/1994 | (JP) . |

OTHER PUBLICATIONS

"Optical Clock Distribution in Electronic Systems," Tewksbury et al., Journal of VLSI Signal Processing, vol. 16, No. 2/03, Jun. 1, 1997, pp. 225–246.

Belanger et al, Introduction To Circuits With Electronics, An Integrated Approach, 1985, pp. 192–193.*

* cited by examiner

*Primary Examiner*—Dennis M. Butler
(74) *Attorney, Agent, or Firm*—Thomas, Kayden, Horstemeyer & Risley, LLP

(57) ABSTRACT

A silicon semi-conductor substrate includes a plurality of sequential devices therein, each sequential device requiring supply of clock pulses thereto at a selected system clock frequency. An infrared laser is disposed to expose the substrate to light pulses occurring at the system clock frequency. A plurality of photosensitive structures are distributed throughout the substrate such that each structure causes a respective sequential element to capture or latch data in response to the detection of the laser light pulses.

18 Claims, 2 Drawing Sheets

PHOTONIC CLOCK DISTRIBUTION METHOD AND APPARATUS FOR ELECTRONIC SYSTEMS

BACKGROUND OF THE INVENTION

1. Field of the Invention

The subject invention relates generally to synchronous digital systems and more particularly to an improved method and apparatus for clock generation in such systems.

2. Description of Related Art

A synchronous digital system is defined as having a single clock signal to which all activity in the system is synchronized. This signal is presently routed on metal wires throughout the system in much the same manner as every other signal in that system. Since the clock signal must go to every sequential element in the system, a very large and complex network results. The parasitics that this large network encounters cause delays in distribution of the clock signal, called clock skew. The maximum clock skew is subtracted from the clock period thus reducing the time budget for logic between sequential elements.

Typically, in the prior art, clock frequencies have been kept low enough that the skew component is small compared to total clock period. Another common practice is to over-constrain the combinatorial logic between sequential elements to be "safe" for any possible clock skew that may be produced for any particular routing of the clock network. Another approach which has been used is to employ phase lock loops to resynchronize clocks at various points a chip. Another approach that is seen in today's in desk top PC's is to run the processor chip at a higher frequency than the rest of the system, but phase locked to the lower system clock rate. One of the reasons for this approach is that high speed clock distribution over anything but the shortest distances (e.g. intrachip) is exceedingly difficult.

Early research was also done into distributing clocks by fiber optics, but such an approach has appeared impractical due to the complex problems presented by the necessity to mix materials in order to create a large and complex fiber network in a semi-conductor substrate or chip.

As system clock rates increase in synchronous digital systems and semiconductor fabrication geometries decrease, clock skew becomes a dominant factor in determining master clock frequency and thus maximum system performance. Concomitantly, the prior art approaches to dealing with clock skew become less and less acceptable.

SUMMARY OF THE INVENTION

The solution provided according to the invention is to apply light pulses to a substrate which causes simultaneous distribution of a system master clock throughout the substrate. Much as a strobe light in the middle of a room illuminates all objects throughout that room simultaneously, so the system clock generated photonically according to the invention triggers all sequential elements in the system simultaneously with essentially zero skew.

Apparatus according to the invention may comprise a light pulse generator disposed to expose a substrate to light pulses occurring at a system clock frequency, the light being of a wavelength selected to move photons simultaneously throughout the substrate. A plurality of photo responsive devices are distributed throughout the substrate causing a latching of data in response to the light pulses.

This technique thus permits a dramatic increase in system performance for synchronous digital systems. The larger the mechanical size of the system is the more benefit this approach provides because it offers essentially zero skew for even the largest assemblies. Implementation of the invention permits much higher system clock rates since the clock rate is roughly proportional to computational capability.

BRIEF DESCRIPTION OF THE DRAWINGS

The features of the present invention, which are believed to be novel, are set forth with particularity in the appended claims. The present invention, both as to its organization and manner of operation, together with various objects and advantages, may best be understood by reference to the following description, taken in connection with the accompanying drawings, of which:

DETAILED DESCRIPTION OF THE PREFERRED EMBODIMENTS

The following description is provided to enable any person skilled in the art to make and use the invention and sets forth the best modes contemplated by the inventors of carrying out his invention. Various modifications, however, will remain readily apparent to those skilled in the art.

Figure 1:
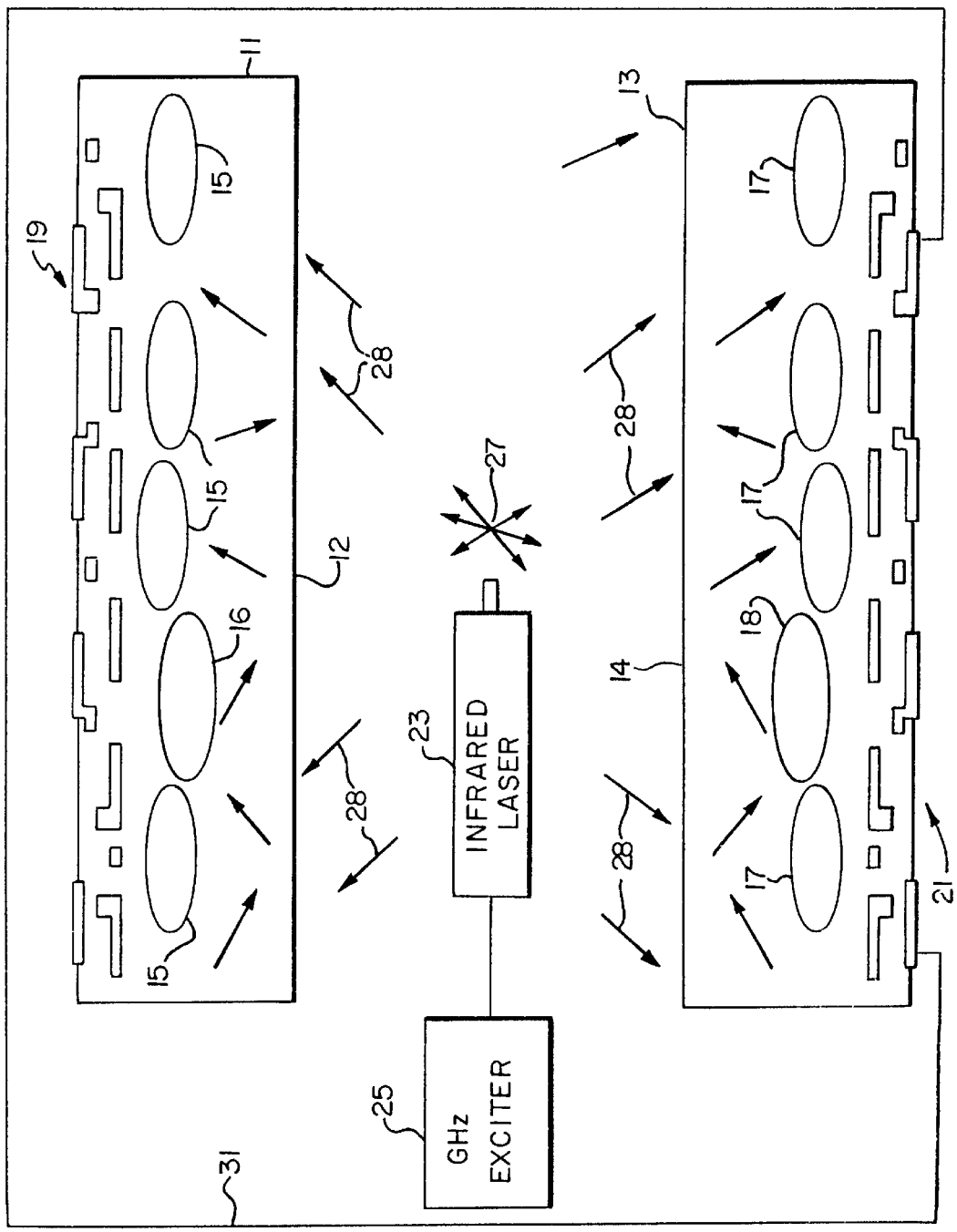
FIG. 1 is a schematic block diagram illustrating a preferred embodiment of the invention.

A preferred embodiment of the invention is illustrated in FIG. 1. In this embodiment, two semi-conductor substrates or dies 11, 13 are arranged in back-to-back relationship. A laser source 23 is disposed to expose the respective back surfaces 12, 14 of each die 11, 13 to light pulses from the laser 23 The dies 11, 13 may be bulk silicon and the laser 23 an infrared laser such that infrared rays 28 impinge initially on an area of bulk silicon.

The laser 23 is driven by an exciter 25 at the selected system clock frequency. The laser or other light source 23 provides a source of light which does not have to be coherent but which is switchable at high frequencies to produce a pulsing light output at a desired system clock frequency.

Each die 11, 13 is further illustrated as having conventional doped regions 15, 17 above which lie metalization layers 19, 21. The metalization layers 19, 21 may be conventional four layer metalization, while the doped regions 15, 17 may comprise conventional MOS structures used to build various devices such as transistors, diodes and capacitors, typically configured to form combinatorial logic and/or various sequential devices.

Further, according to the preferred embodiment, a photo responsive device such as a photodiode 16, 18 is associated with each sequential device fabricated in the respective substrates 11, 13 Such photodiodes 16, 18 may be also fabricated according to conventional known semi-conductor fabrication techniques. Each photo diode 16, 18 acts as a photo gate to trigger latching of data by one of the sequential devices.

Figure 2:
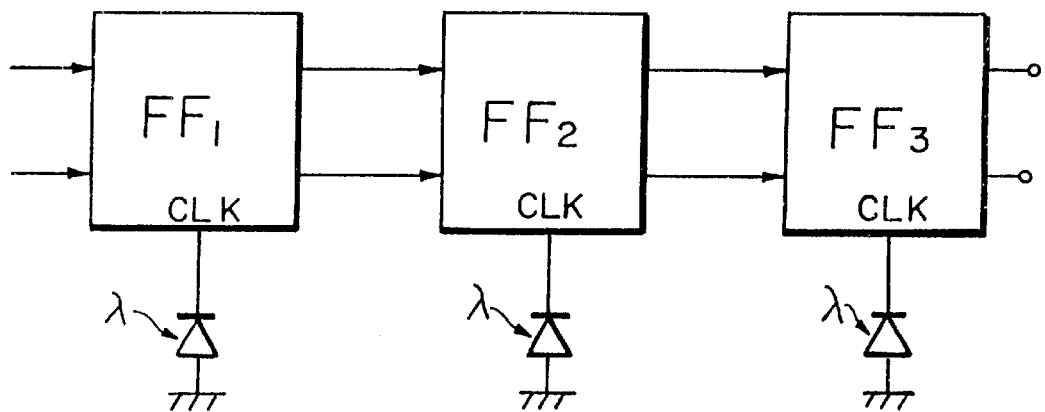
FIG. 2 is a circuit block diagram illustrating a sequential device clocked according to the preferred embodiment.
Figure 3:
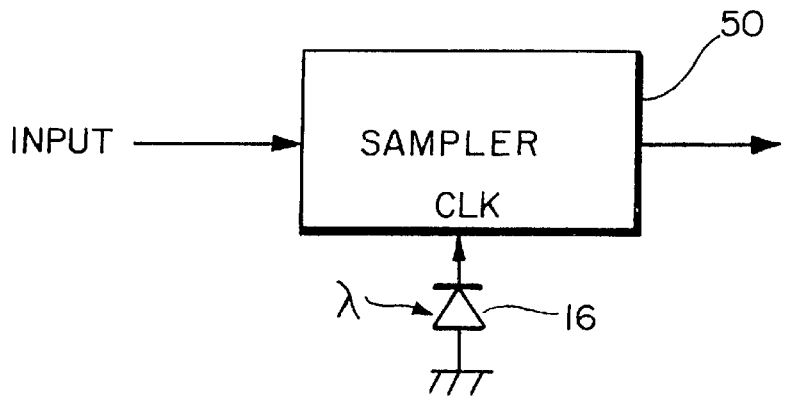
FIG. 3 is a circuit block diagram illustrating a second sequential device clocked according to the embodiment.

The term "sequential device," refers to circuit components fabricated in the substrate which require input of the system clock signal. For example, FIG. 2 illustrates a series of flip flops FF1, FF2, FF3, each of which requires a system clock input CLK, which is supplied by a respective photodiode 16, while FIG. 3 illustrates a sampling circuit 50 arranged to sample an input signal at the system clock rate, as determined by the output of a photodiode 16. A myriad of other such devices are known to those skilled in the art.

Figure 4:
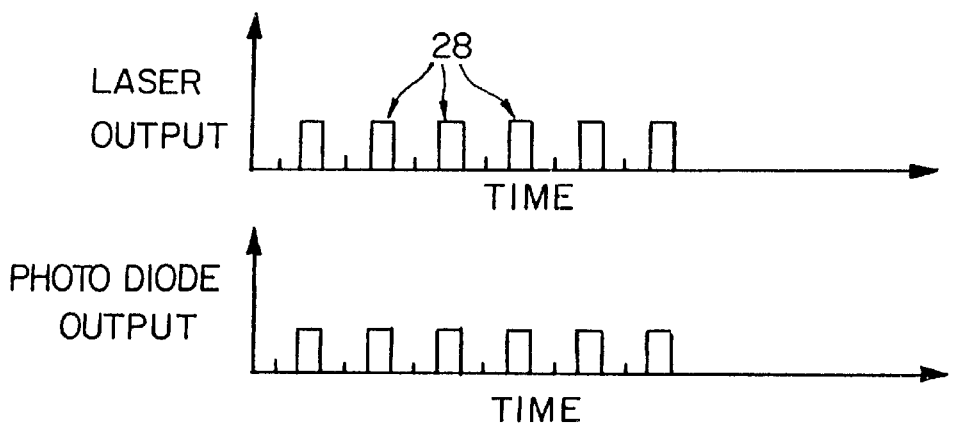
FIG. 4 is a waveform diagram useful in illustrating operation of the preferred embodiment.

In operation of the embodiment of FIG. 1, photons enter the two back surfaces 12, 14 of each die. The bulk silicon transmits or passes the infrared light, which is scattered throughout the crystal lattice of the material. Each photodiode 16 throughout the substrate is thereby simultaneously activated to provide the appropriate clock signal at the proper instant in time. Application of a light pulse train 52 (FIG. 4) to the substrate, thus results in generation of an electrical voltage pulse train, i.e., a periodic clock signal by each photodiode 16, 18.

While the preferred embodiment illustrates photons impinging from the back surfaces of respective dies, in other embodiments, the top surface of one or more dies could be exposed to laser radiation such as rays 28 of FIG. 1 in order to generate a suitable system clock frequency following the teachings herein.

The just-described clock generation technique is applicable to both monolithic "systems on a chip" and to complex electronic assemblies such as a multichip module or a PC board. The light is carried from its source such as a modulated solid state laser through the materials from which the system is constructed to the photo sensitive sequential elements. The presently preferred choice of wavelengths lies in the infrared due to the efficiencies of silicon in both emitter and detector at those wavelengths. Materials that can convey infrared light and are seen in electronic systems are air, oil (for cooling), clear epoxy resins, and most importantly bulk silicon. Every other signal in the system may be transmitted as before (electronically); only the master clock needs be distributed photonically.

This technique thus permits a dramatic increase in system performance for synchronous digital systems. The larger the mechanical size of the system, the more benefit this approach provides because it offers essentially zero skew for even the largest assemblies. Implementation of the invention permits much higher system clock rates since the clock rate is roughly proportional to computational capability.

Those skilled in the art will appreciate that various adaptations and modifications of the just-described preferred embodiment can be configured without departing from the scope and spirit of the invention. Therefore, it is to be understood that, within the scope of the appended claims, the invention may be practiced other than as specifically described herein.

What is claimed is:

1. An apparatus comprising:
    a semi-conductor substrate including a plurality of sequential devices therein, each sequential device requiring a supply of clock pulses at a selected system clock frequency;
    a light pulse generator disposed to expose the semi-conductor substrate to light pulses occurring at the system clock frequency at a wavelength selected to cause a uniform supply of photons simultaneously throughout the substrate; and
    a plurality of photodiodes distributed through said substrate for generating signal pulses in response to the light pulses from the light pulse generator.

2. The apparatus of claim 1 wherein the semi-conductor substrate is a silicon substrate and wherein the wavelength of the light from the light pulse generator is selected to be in the infrared spectrum.

3. A method of generating a clock signal for sequential devices formed on a semi-conductor substrate, the steps of the method comprising:
    establishing a plurality of photo-responsive devices in the semi-conductor substrate, the photo responsive devices being connected to the sequential devices and located throughout the semi-conductor substrate, each photo responsive device being responsive to an incident light pulse;
    generating light pulses at a selected clock signal frequency;
    exposing the semi-conductor substrate to the generated light pulses thereby causing the photo-responsive devices to simultaneously generate signal pulses in response to the light pulses.

4. The method of claim 3 wherein each photo-responsive device comprises a photodiode.

5. The method of claim 4 wherein the substrate comprises silicon.

6. The method of claim 5 wherein the light pulses have a wavelength in the infrared spectrum.

7. The method of claim 3 further including the step of employing a laser to generate the light pulses.

8. The method of claim 6 further including the step of employing a laser to generate the light pulses.

9. The method of claim 3 wherein said substrate comprises silicon and wherein an infrared laser is employed to generate the light pulses.

10. The method of claim 3 wherein the light pulses have a wavelength in the infrared spectrum.

11. An apparatus comprising:
    a light pulse generator located for exposing an entire semiconductor substrate to light pulses occurring eminating at a system clock frequency from the light pulse generator;
    a plurality of photo-responsive structures located in the semi-conductor substrate for generating signal pulses in response to the light pulses; and
    a plurality of sequential devices responsive to the signal pluses from the photo-responsive structures to latch data at it's input.

12. The apparatus of claim 11 wherein the semi-conductor substrate is a silicon substrate and wherein the wavelength of light from the light pulse generator is selected to be in the infrared spectrum.

13. The apparatus of claim 12 wherein each photo-responsive structure comprises a photodiode.

14. The apparatus of claim 11 wherein each photo-responsive structure comprises a photodiode.

15. The apparatus of claim 11 wherein light pulse generator comprises a pulsed laser.

16. The apparatus of claim 15 wherein the laser is an infrared laser.

17. The apparatus of claim 16 wherein each photo-responsive structure comprises a photodiode.

18. The apparatus of claim 11 wherein the light pulse generator is an infrared laser.

* * * * *